United States Patent [19]

Satre

[11] 4,377,987
[45] Mar. 29, 1983

[54] SYSTEM FOR GROWING OYSTERS

[76] Inventor: Alf R. Satre, Vatnaneset 31, N-5075 Hakonshella, Norway

[21] Appl. No.: 316,836

[22] Filed: Oct. 30, 1981

[51] Int. Cl.³ .............................................. A01K 61/00
[52] U.S. Cl. ........................................................ 119/4
[58] Field of Search ......................................... 119/4, 2

[56] References Cited

U.S. PATENT DOCUMENTS

| 2,989,945 | 6/1961 | Ford ......................................... 119/4 |
| 3,675,626 | 7/1972 | Down ....................................... 119/4 |
| 3,853,095 | 12/1974 | Lawrence ............................... 119/4 |
| 3,870,019 | 3/1975 | NcNicol .................................. 119/4 |

FOREIGN PATENT DOCUMENTS

| 1362046 | 4/1964 | France ..................................... 119/4 |
| 1399933 | 7/1975 | United Kingdom .................... 119/4 |

Primary Examiner—Hugh R. Chamblee
Attorney, Agent, or Firm—Barnes & Thornburg

[57] ABSTRACT

In combination with a vertical row of trays suspended from carrying ropes and enveloped by a protection net where each tray has a rim and bottom net for holding oysters, a system for releasably fastening the trays to the carrying ropes; the fastening system includes converging notches or indentations in the rim of each tray and an enlarged detent on each carrying rope for releasably engaging the notches or indentations.

8 Claims, 4 Drawing Figures

SYSTEM FOR GROWING OYSTERS

BACKGROUND OF THE INVENTION

The invention relates to a system for growing oysters.

It is known from U.S. Pat. No. 2,989,945 a seafood growing system, wherein a series of trays are suspended on a frame in a vertical stack with a distance between adjacent trays in the row.

It is further known from U.S. Pat. No. 3,675,626 an oyster growing system with a series of rings suspended on ropes, each ring being tied in a loop or pierced by each rope. Both these systems have shown inadequate for practical purposes, mainly because of the complicated handling.

OBJECT OF THE INVENTION

The principal object of the present invention is to provide an oyster growing system, which is easy to handle and which may be built up of cheap and water resistant components.

Another object of this invention is to provide an oyster growing system in which each tray can be removed independently from the system for inspection, repair and other purposes.

SUMMARY OF THE INVENTION

These objects can be achieved by an oyster growing system according to claim 1. Further features of the invention are stated in the sub claims.

The stated and other objects of the invention will become apparent from the following description with reference to the accompanying drawings.

Figure 1:
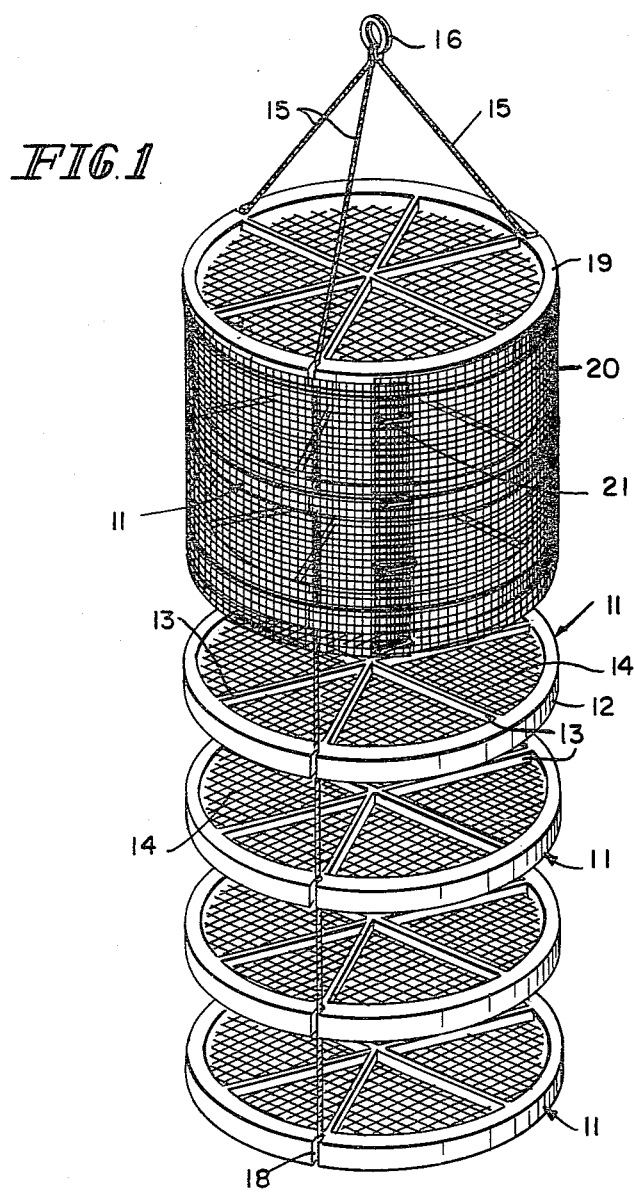
FIG. 1 shows a perspective view of a row of trays making av part of a system according to the invention, with a part of the protection net removed.

Although specific forms of the invention have been selected for illustration in the drawings, and the following description is drawn in specific terms for the purpose of describing these forms of invention, this description is not intended to limit the scope of the invention which is defined in the appended claims.

The main element of the oyster growing system according to the invention is a circular tray or dish 11 with a low rim 12 on the periphery, three diametrically extending reinforcement ribs 13 and a bottom net 14. The ribs 13, which are preferably integrated with the rim 12, as is the bottom net 14, and manufactured of a plastic material, divide each tray 11 into separated areas, to prevent movement of the oysters 22 (FIG. 2) on handling.

The trays are arranged in vertical rows, e.g. from six to ten in each. The number of trays 11 may however be outside this range.

Figure 3:
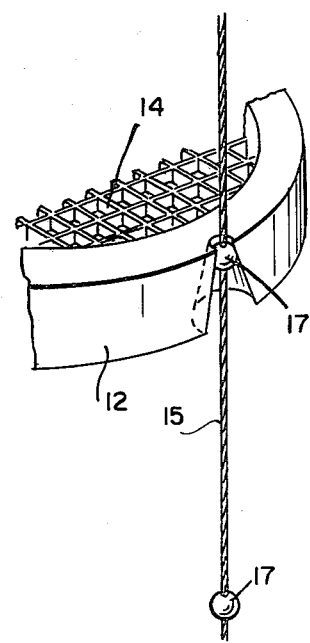
FIG. 3 shows a perspective view of a detail of the fastening of a tray to a rope.
Figure 4:
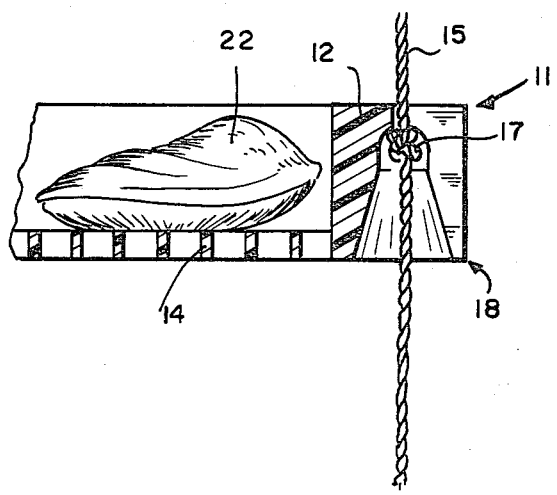
FIG. 4 shows a fragmentary cross-sectional view of a detail of a second embodiment of a system embodying the present invention for fastening a tray to a rope.

The trays 11 are maintained in the row by three ropes 15 which at the upper end is joined in a hoisting ring 16. Each rope 15 is for each tray 11 provided with a detention ball 17, preferably of a plastic material, welded to the rope or otherwise suitably fastened, as shown in FIG. 3. To fasten the detention ball 17 which alternatively may be knots, as shown in FIG. 4, each tray 11 is at its rim provided with three evenly distributed notches or indentations 18, which converge conically see FIGS. 2 and 3, or stepwise, see FIG. 4, toward the upper end and which thus have a sideward slot for insertion of the rope. The balls 17 thus can be moved into the indentations 18 from the lower side and will then be stopped by the contraction in the higher part of the duct. This enables the removal of each tray 11 independent of the other in the row.

The row of trays is closed at the upper end by a cover or lid 19 corresponding to the tray 11. The row is closed sideways by plastic nets 20, each suspended removable around two and two trays 11, fastened by hooks 21. The net 20 is strip formed and two or more hooks 21 are fastened at one end. Alternatively, each net 21 can cover move than two trays 11.

By using three carrying ropes 15, the distance between the indentations 18 at the rim 12 will be 120°. This enables removal and remounting of a tray 11 without disturbing the suspension of the rest of the row.

The removable nets 20 will take most of the plankton and other contamination present in the sea during the time of use. As the nets are easily removable, exchanges or cleansing will consume moderate time.

The diameter of the trays 11 may be adapted to specific condition. In one example, a diameter of 32 inches was suitable. Similarly, the height of the rim 12 may vary, e.g. around 1 inch. The ribs 13 may have the same height as the rim 12.

Figure 2:
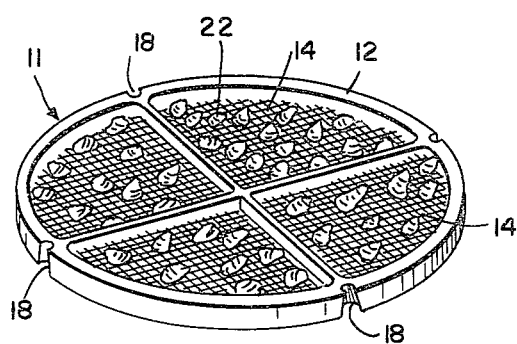
FIG. 2 shows a perspective view in elevation, of a second embodiment of a tray.

In FIG. 2 is shown an alternative embodiment, with only two crossing ribs 13. The figure shows oysters 22 on the tray 11.

Various modification in the shape of the trays 11, the number of ropes 15, and the fastening means may be possible. E.g. can the indentation 17 in a less preferable embodiment be replaced by tabs or protrusions mating loops or similar openings in a carrying cord or ribbon.

This system may also prove suitable for growing other seafood than oysters. More stacks of trays 11 may be suspended in the sea on a particular location.

What claimed is:

1. In an oyster growing system with a vertical row of trays, each having a rim and a bottom net, being suspended from carrying ropes and being enveloped by a protection net, the improvement comprising fastening means on the rim of each tray for independently releasably fastening the trays to each carrying rope, the fastening means including indentations in the rim of each tray and detention members on each rope for insertion into the indentations, each indentation including a contraction providing a downwardly opening catch for a detention member whereby each tray is independently supported on the detention members.

2. System according to claim 1 wherein the detention members consist of plastic balls welded on the ropes.

3. System according to claim 1 wherein the detention members consist of a series of knots in the ropes.

4. System according to claim 1 wherein the indentations are generally conically shaped, converging toward the top of the rim.

5. System according to claim 1 wherein the indentations include a slot in the side of the rim for insertion of the rope.

6. In an oyster growing system with a vertical row of trays, each tray having a rim and a bottom net, being suspended from carrying ropes and being enveloped by a protection net, the improvement comprising fastening means on the rim of each tray for independently releasably fastening the trap to each carrying rope, the fastening means including a generally conical shaped indentation in the rim which converges toward the top of the rim to catch a corresponding detention member on each rope.

7. In an oyster growing system with a vertical row of trays, each tray having a rim and a bottom net, being suspended from carrying ropes and being enveloped by a protection net, the improvement comprising fastening means on the rim of each tray for independently releasably fastening the trays to each carrying rope, the fastening means including spaced-apart detention members on each rope and downwardly opening receivers on the rims of the trays for receiving the detention members, the receivers providing catches for the detention members whereby the trays are releasably supported on the detention members.

8. System according to claim 7 wherein each receiver includes a slot in the side of the rim for insertion and removal of a carrying rope.

* * * * *